(12) United States Patent
Supina et al.

(10) Patent No.: US 7,632,202 B2
(45) Date of Patent: Dec. 15, 2009

(54) POWERTRAIN FOR A HYBRID VEHICLE WITH ALL-WHEEL DRIVE CAPABILITY AND METHOD FOR CONTROLLING WHEEL SLIP

(75) Inventors: Joseph Supina, Saline, MI (US);
Shailesh Kozarekar, Novi, MI (US);
Stefan P. Pototschnik, Superior Twp, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 11/870,688

(22) Filed: Oct. 11, 2007

(65) Prior Publication Data

US 2008/0026898 A1 Jan. 31, 2008

Related U.S. Application Data

(60) Division of application No. 11/276,773, filed on Mar. 14, 2006, now Pat. No. 7,314,424, which is a division of application No. 10/747,429, filed on Dec. 29, 2003, now Pat. No. 7,163,480, which is a continuation-in-part of application No. 10/463,046, filed on Jun. 17, 2003, now abandoned, which is a continuation of application No. 09/848,038, filed on May 3, 2001, now abandoned.

(60) Provisional application No. 60/447,081, filed on Feb. 14, 2003.

(51) Int. Cl.
*B60K 6/02* (2006.01)

(52) U.S. Cl. ............................................. 475/5; 903/916

(58) Field of Classification Search ...................... 475/5; 903/916
See application file for complete search history.

(56) References Cited

U.S. PATENT DOCUMENTS

| | | | | |
|---|---|---|---|---|
| 3,057,427 | A | * | 10/1962 | Glasgow ...................... 180/243 |
| 5,164,903 | A | | 11/1992 | Lin et al. |
| 5,337,848 | A | | 8/1994 | Bader |
| 5,346,031 | A | * | 9/1994 | Gardner ...................... 180/179 |
| 5,376,868 | A | | 12/1994 | Toyoda et al. |
| 5,508,924 | A | | 4/1996 | Yamashita |
| 5,558,173 | A | | 9/1996 | Sherman |
| 5,558,588 | A | | 9/1996 | Schmidt |
| 5,558,589 | A | | 9/1996 | Schmidt |
| 5,788,005 | A | * | 8/1998 | Arai ...................... 180/65.285 |
| 5,839,084 | A | | 11/1998 | Takasaki et al. |
| 5,839,535 | A | | 11/1998 | Arai |
| 5,856,709 | A | | 1/1999 | Ibaraki et al. |
| 5,931,757 | A | | 8/1999 | Schmidt |
| 5,935,035 | A | | 8/1999 | Schmidt |

(Continued)

*Primary Examiner*—Sherry Estremsky
(74) *Attorney, Agent, or Firm*—David B. Kelley; Brooks Kushman P.C.

(57) ABSTRACT

A hybrid-electric powertrain and control method for a vehicle having forward traction wheels and rearward traction wheels in an all-wheel drive configuration. An engine and an electric motor deliver power through delivery paths to the traction wheels. The power delivery paths may have multiple ratio gearing so that more power can be delivered mechanically to improve powertrain performance and to allow the electric motor size to be reduced. The powertrain may include a controller for automatically balancing power distribution to the forward and rearward traction wheels to avoid wheel slip.

5 Claims, 8 Drawing Sheets

U.S. PATENT DOCUMENTS

| | | |
|---|---|---|
| 5,988,307 A | 11/1999 | Yamada et al. |
| 5,993,350 A | 11/1999 | Lawrie et al. |
| 6,007,451 A * | 12/1999 | Matsui et al. ............ 477/19 |
| 6,176,808 B1 | 1/2001 | Brown |
| 6,205,379 B1 * | 3/2001 | Morisawa et al. .......... 701/22 |
| 6,349,782 B1 | 2/2002 | Sekiy et al. |
| 6,428,438 B1 | 8/2002 | Bowen |
| 6,449,552 B2 | 9/2002 | Ohba et al. |
| 6,484,832 B1 | 11/2002 | Morisawa et al. |
| 6,524,217 B1 | 2/2003 | Murakami et al. |
| 6,549,840 B1 | 4/2003 | Mikami et al. |
| 6,569,055 B2 | 5/2003 | Urasawa et al. |
| 6,579,201 B2 | 6/2003 | Bowen |
| 6,615,940 B2 | 9/2003 | Morisawa |
| 6,617,704 B2 | 9/2003 | Tomikawa |
| 6,685,591 B2 | 2/2004 | Hanyu et al. |
| 6,909,959 B2 | 6/2005 | Hallowell |
| 7,000,717 B2 | 2/2006 | Ai et al. |
| 7,223,200 B2 * | 5/2007 | Kojima et al. ............ 477/3 |
| 2002/0056584 A1 | 5/2002 | Nakasako et al. |
| 2002/0123407 A1 * | 9/2002 | Hanyu et al. ............ 475/5 |
| 2003/0094322 A1 | 5/2003 | Bowen |
| 2003/0132044 A1 | 7/2003 | Kitano et al. |
| 2003/0173123 A1 | 9/2003 | Nakanowatari |
| 2004/0116231 A1 | 6/2004 | Porter |
| 2004/0176203 A1 | 9/2004 | Supina et al. |

* cited by examiner

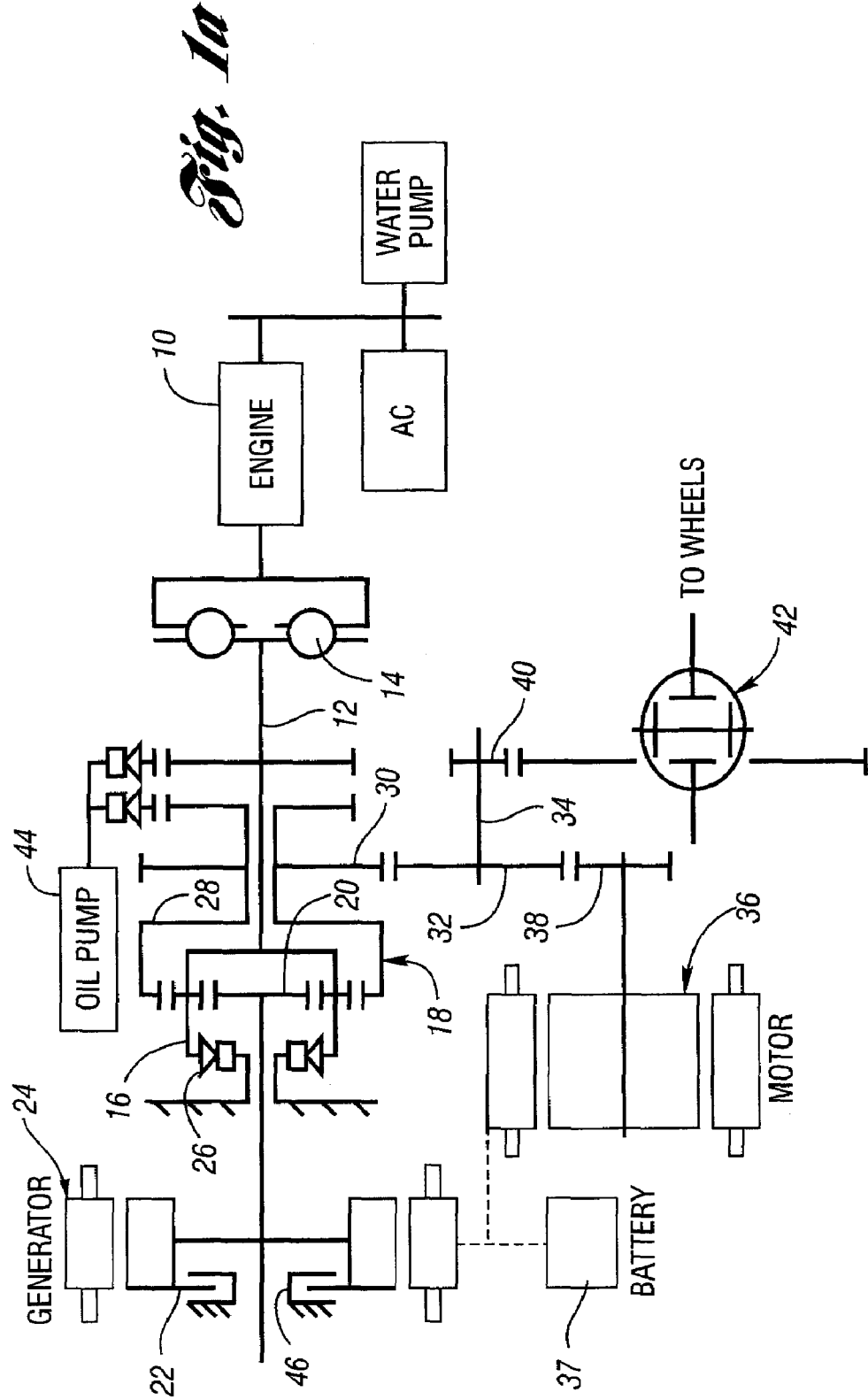

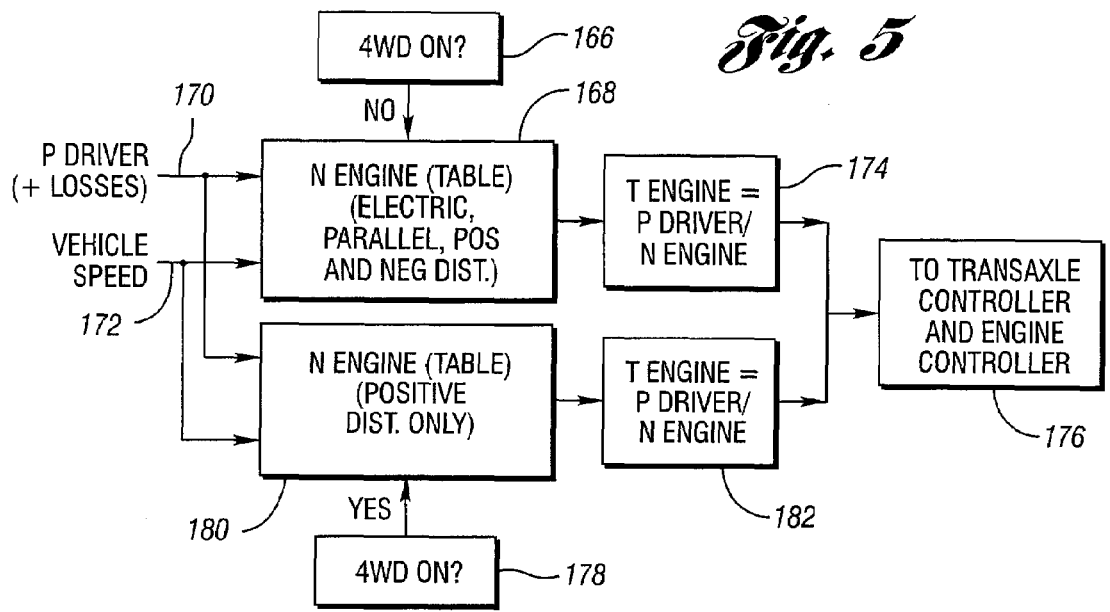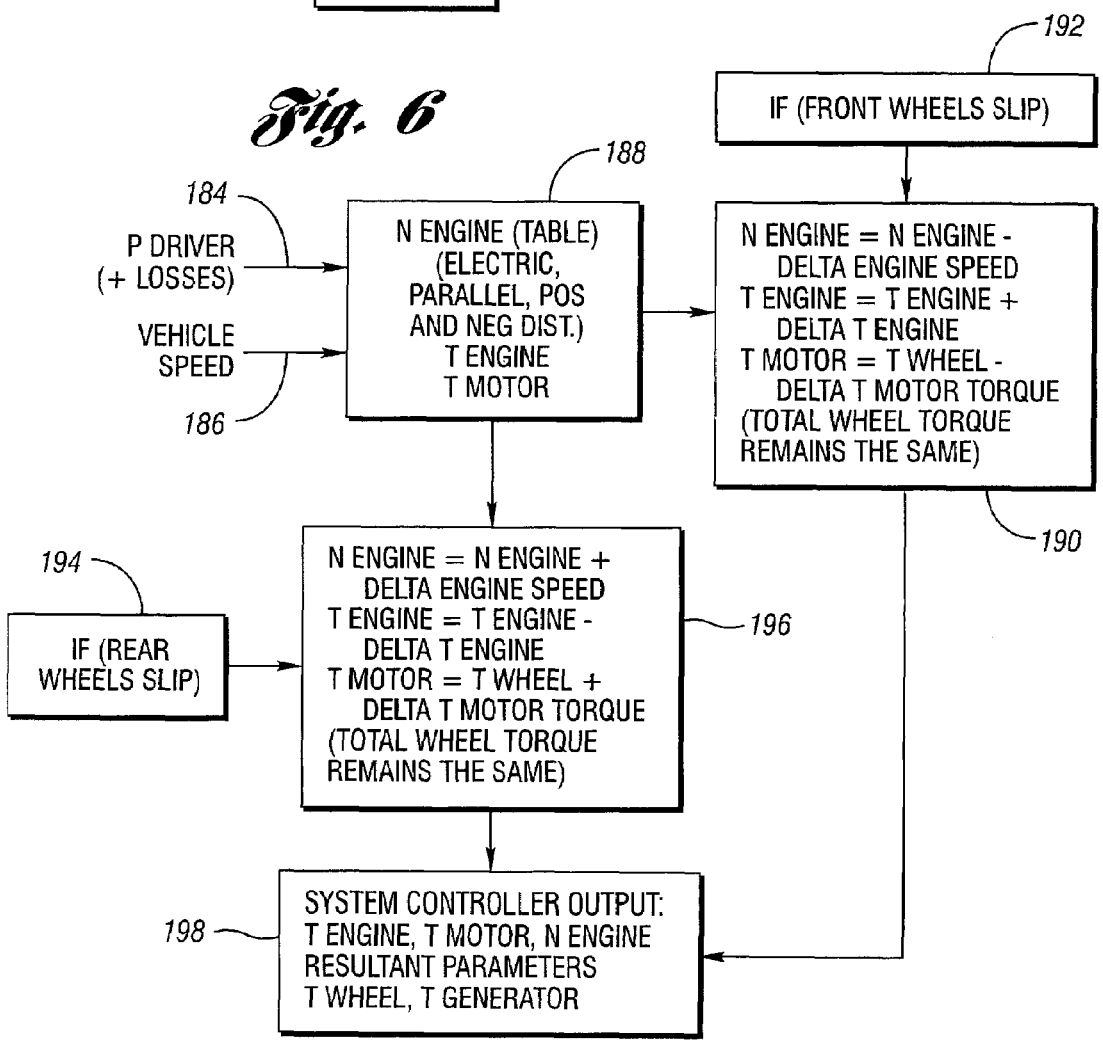

POWERTRAIN FOR A HYBRID VEHICLE WITH ALL-WHEEL DRIVE CAPABILITY AND METHOD FOR CONTROLLING WHEEL SLIP

CROSS-REFERENCE TO RELATED APPLICATIONS

This application is a divisional of U.S. application Ser. No. 11/276,773, filed Mar. 14, 2006, now U.S. Pat. No. 7,314,424 issued Jan. 1, 2008, which is a divisional of U.S. application Ser. No. 10/747,429, filed Dec. 29, 2003, now U.S. Pat. No. 7,163,480, which is a continuation-in-part of U.S. application Ser. No. 10/463,046, filed Jun. 17, 2003, entitled "Method and Apparatus for Transferring Torque and a Hybrid Vehicle Incorporating the Method and Apparatus," now abandoned, which is a continuation of U.S. application Ser. No. 09/848,038, filed May 3, 2001, now abandoned. Applicants claim priority to those applications and to U.S. provisional application Ser. No. 60/447,081, filed Feb. 14, 2003. U.S. Pat. No. 7,128,677 issued on Oct. 31, 2006 is a divisional application of Ser. No. 10/747,427 filed Dec. 29, 2003, now U.S. Pat. No. 7,086,977 which is a continuation-in-part of U.S. application Ser. No. 10/463,046 filed Jun. 17, 2003. All of these patents and applications are assigned to the assignee of the present application.

BACKGROUND OF THE INVENTION

1. Field of the Invention

The present application relates to powertrains for hybrid-electric, all-wheel drive vehicles and to a method for managing power distribution to vehicle traction wheels.

2. Background Art

U.S. patent application Ser. No. 10/463,046, filed Jun. 17, 2003, identified above, and U.S. Pat. No. 5,856,709 disclose hybrid-electric powertrains capable of delivering driving torque to traction wheels of an automotive vehicle through a geared transmission that establishes multiple powerflow paths from an engine power source and an electrical power source. The '046 patent application is assigned to the assignee of the present invention.

The powertrains disclosed in the '709 patent, as well as the copending '046 patent application, may be adapted to both front-wheel drive and rear-wheel drive configurations for hybrid-electric vehicles. U.S. Pat. No. 6,176,808 discloses another example of a hybrid-electric vehicle powertrain of this type.

The '046 patent application and the '808 and '709 patents are incorporated in the disclosure of this application by reference.

In known geared transmission configurations for hybrid-electric vehicles with multiple power sources, an electric motor typically is connected to the driving wheels through a set of fixed ratio gears. This provides improved launch torque as motor torque is multiplied by the gearing. A high torque multiplication for the torque flow path for the motor, however, requires a compromise between the maximum output speed required and the initial acceleration torque needed during a vehicle launch if the electric motor gearing has a fixed ratio. The need for this is due in part to the use of fixed ratio gearing in the driving torque flow paths from the multiple power sources to the traction wheels.

In the case of a hybrid-electric vehicle powertrain of the kind disclosed in the previously identified copending patent application, recovery of regenerative electrical energy in the powertrain may be limited because the electric motor is connected mechanically only to the rear traction wheels.

SUMMARY OF THE INVENTION

The present invention is adapted particularly for use in an all-wheel drive hybrid-electric vehicle powertrain. To balance the different requirements for improved performance and improved fuel economy, a downstream torque multiplying gear set is used, which avoids an increase in the motor and generator sizes. In this fashion, more power is transmitted mechanically.

The present invention avoids the need for a compromise between performance and fuel economy by providing powerflow paths from the traction motor and the engine to the traction wheels with multiple gear ratios. This provides independent control over the launch torque and the maximum vehicle speed. Further, the present invention improves the ability of the powertrain to recover regenerative electrical energy by installing the electric motor in the powertrain in coaxial disposition with respect to the vehicle front wheels and by connecting electrically the electric motor to the battery.

In embodiments of the present invention included in this disclosure, the engine is connected to the carrier of a planetary gear unit. Like the front-wheel drive embodiment of the powertrain disclosed in the previously identified copending patent application, the generator of the present invention is connected to the sun gear and the ring gear is connected to the traction wheels through a two-speed gearing arrangement and a differential-and-axle assembly. The traction motor is coaxially disposed on the front-wheel axis, the motor rotor being directly connected to the axle shafts for the forward traction wheels. In an alternate embodiment of the present invention, a second planetary gear set is placed on the front-wheel axis between the motor generator and a front traction wheel.

Unlike the powertrain configurations of the copending patent application where the motor is connected through gearing to the ring gear of a planetary gear unit at the torque output side of the motor, the motor in the powertrain of the present invention is not connected directly to the ring gear. However, a mechanical powerflow path between the motor and the ring gear is maintained as the rear traction wheels drive the front traction wheels in a powerflow path through the road.

The traction motor is directly coupled to the road, as explained above, and there is a shift available in the powertrain configuration of the present invention. This shift is designed to occur during low load operating modes for the transmission. The motor at the front wheels, during the shift, can adequately fill any loss of driving torque as the transmission is shifted from one ratio to the other. This eliminates a so-called "torque hole" or torque interruption during a synchronous shift.

In one of the embodiments disclosed in this application, there are two gear sets, each having two ratios. The ratios for the two gear sets are staggered, as are the shift points. A positive power delivery to the wheels thus is maintained. Because of this characteristic, a synchronous shift is not required in either of the gear sets. Control of the shift thus is simplified.

As previously indicated, the multiple powerflow paths in the all-wheel drive hybrid-electric powertrain of the invention cause torque to be transmitted electrically as the rear wheels drive the front wheels and engine power and motor power are delivered to different sets of wheels. Torque compensation during engine start-up could, under some circumstances, be difficult to achieve. To improve torque compensation and improve torque compliance at each set of wheels, it is possible with an alternate embodiment of the present invention to slip the low ratio and high ratio clutches of the transmissions at a fixed torque that is equivalent to the reaction torque required for an engine start-up. If slip is detected during engine start-up, the pressure at the clutches is increased to increase the clutch engagement torque. When the controller detects that the engine is at a stable combustion speed, the engine torque is increased to a desired level while slipping the clutch. As soon as the desired engine speed is achieved, the clutch is fully engaged, thus creating a torque transfer to the wheels.

In still another embodiment of the invention, improved performance during engine start-up can be achieved by using an additional reaction brake that grounds the ring gear on the torque output side of the generator motor while the drive clutches are disengaged. This eliminates a torque transfer to the wheels during engine start and engine shutdown. Thus, no torque disturbances are transferred to the wheels. Once the engine speed is brought up to a stable operating level, the drive clutch is engaged, thereby again transferring power to the traction wheels.

Another aspect of the present invention comprises a strategy for modifying the distribution of torque to the two sets of traction wheels for an all-wheel drive configuration of a hybrid-electric vehicle powertrain. In such powertrains, power can be transmitted between the front and rear traction wheels in any proportion. This improves fuel economy.

During operation in the all-wheel drive mode, driver expectation is to have a specific percentage power distribution to the front wheels and to the rear wheels. This is achieved by making the powertrain operate in a positive power distribution mode, whereby mechanical energy is distributed to the rear wheels and electrical energy is distributed to the front wheels. The engine speed and torque are continuously modified in this configuration to achieve the correct balance between the two energy sinks.

Slip control can be implemented when slip is detected, or slip control can be used continuously. It is possible using this embodiment of the invention for an all-wheel drive operating mode to be selected, wherein power is distributed between the front traction wheels and the rear traction wheels with a distribution ratio of around 50% to 50% as the controller alters engine speed and torque to maintain the desired power distribution to the front and rear traction wheels.

BRIEF DESCRIPTION OF THE DRAWINGS

FIG. 1*a* is a schematic representation of a powertrain of the kind disclosed in the copending patent application previously identified, which can be adapted for use with a front-wheel drive hybrid-electric vehicle powertrain;

FIG. 5 is a flow chart illustrating software control strategy for an all-wheel drive transmission operating in either a four-wheel drive mode or a two-wheel drive mode; and FIG. 6 is a schematic block diagram showing the control strategy for an all-wheel drive hybrid-electric powertrain that compensates for traction wheel slip at the front wheels and for traction wheel slip at the rear wheels, wherein the engine speed and torque are continuously modified to achieve a desired torque balance.

DETAILED DESCRIPTION OF EMBODIMENTS OF THE INVENTION

Figure 1:
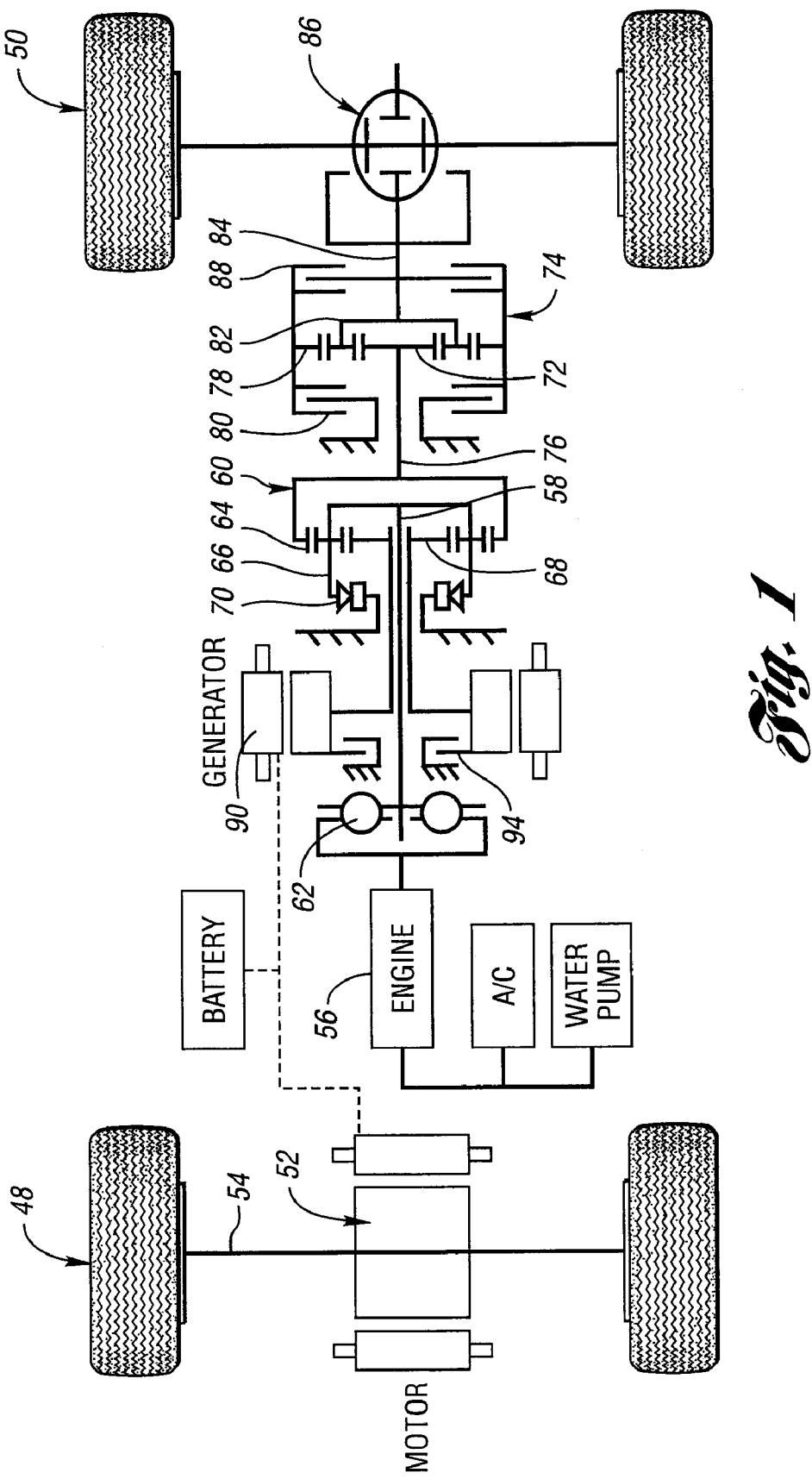
FIG. 1 is a schematic representation of an all-wheel drive hybrid-electric vehicle powertrain having two coaxially disposed planetary gear units with a generator and an engine on a common axis and an electric motor on the front wheel axis.

FIG. 1 is a schematic illustration of a hybrid-electric vehicle powertrain with all-wheel drive capability. For the purpose of describing the mode of operation and the performance of the powertrain illustrated in FIG. 1, reference first will be made to the front-wheel drive configuration shown in FIG. 1*a*. This front-wheel drive configuration is disclosed in the previously identified copending patent application.

As seen in FIG. 1*a*, an engine 10 is connected to transmission input shaft 12 through a mechanical spring damper 14. Shaft 12 is connected to the carrier 16 of a planetary gear unit 18. The sun gear 20 of the gear unit 18 is connected to the rotor 22 of an electric generator 24. An overrunning coupling or brake 26 prevents the carrier 16 and the engine from being driven with reverse motion while allowing the generator to deliver torque to the wheels when the engine is turned off.

The ring gear 28 of planetary gear unit 24 is connected drivably to countershaft drive gear 30 and to countershaft gear 32, thus driving the intermediate shaft 34. An electric traction motor 36 is drivably connected to the intermediate shaft through gears 38 and 32. Countershaft gear 40 meshes with the ring gear of a differential-and-axle assembly 42 for the traction wheels. A transmission oil pump 44 is drivably geared to shaft 12. Battery 37 is electrically coupled to motor 36 and generator 24.

When a vehicle with the transmission arrangement shown in FIG. 1*a* is in a highway cruise mode, the generator brake 46 is applied. This establishes a geared connection between the engine driven shaft 12 and the differential-and-axle assembly 42.

If the generator brake 46 is applied, the powerflow path is fully mechanical. The power source can be fully electrical if the vehicle is launched from a standing start with the engine off. A positive distribution of power occurs when the generator absorbs torque and the motor is applying drive torque. When the motor absorbs torque and the generator rotates and contributes power that assists the engine, a negative power distribution occurs. With both positive power distribution and negative power distribution, a part of the energy is transferred electrically and part is transferred mechanically.

In FIG. 1, a first embodiment of a hybrid-electric vehicle powertrain of the invention is illustrated. It includes front traction wheels 48 and rear traction wheels 50. A high-torque induction motor 52 is mounted coaxially with respect to the axis of axle shaft 54, the rotor of the motor 52 being connected directly to the wheels. Other types of electric motors could be used if that would be feasible.

An internal combustion engine 56 drives a torque input shaft 58 for a first planetary gear unit 60. The connection between the gear unit 60 and the engine 56 includes a mechanical damper 62.

The planetary gear unit 60 comprises a ring gear 64, a planetary carrier 66, and a sun gear 68, the carrier being connected directly to the torque input shaft 58. An overrunning coupling 70 provides a torque reaction for the carrier 66 as carrier torque is delivered to the transmission case.

The ring gear 64 is connected to sun gear 72 of a second planetary gear unit 74 coaxially disposed with respect to the gear unit 60. A connection between ring gear 64 and sun gear 72 is established by torque transfer shaft 76.

Ring gear 78 of planetary gear unit 74 can be braked by friction brake 80 to provide a torque reaction point for planetary gear unit 74 as torque is delivered from shaft 76 to the carrier 82, which in turn is drivably connected through torque output shaft 84 to differential-and-axle assembly 86 for the rear traction wheels 50. The carrier 82 can be connected selectively to shaft 84 through friction clutch 88. When clutch 88 is applied, the speed ratio across planetary gear unit 74 is 1:1. When brake 80 is applied and clutch 88 is released, ring gear 78 acts as a reaction element. Clutch 88 and brake 80 define a clutch and brake friction element sub-assembly.

A generator 90 has a rotor connected directly through a sleeve shaft to the sun gear 68 of gear unit 60. Sun gear 68 can be braked by braking the rotor of the generator 90 by means of friction brake 94.

As mentioned before, engine torque is delivered to the carrier 66. Power then is distributed through two powerflow paths by the planetary gear unit 60, the reaction torque on gear 68 being distributed to the rotor of the generator 90. When the generator speed is greater than zero, it generates power for use by the motor 52. When the generator speed is less than zero or negative, it acts as a motor as torque is distributed to the sun gear 68 through the shaft 92 from the rotor of the generator 90. This is a so-called negative power distribution as the generator acts as a motor. If the generator speed is positive or greater than zero, there is a positive power distribution. The generator, as it acts in either of the two operating modes, is able to control engine speed, and thus it can be considered to be an engine speed controller. Controlling the engine in this fashion is more efficient than conventional methods for controlling the engine using air flow sensors, fuel sensors, or spark advance and retard devices in the case of an internal combustion engine with spark ignition.

The generator can be used to adjust engine speed so that the engine will operate at its most efficient operating point on the engine speed-torque characteristic plot.

In the case of the design of FIG. 1a, when the powertrain is acting with negative power distribution, the generator acts as a motor. The generator needs to supply negative torque to control the engine speed as the motor acts as a generator. The speed of the generator also is negative, so the ring gear 64 is driven in a positive direction. The effective torque acting on the ring gear then is the algebraic sum of the torque provided by the motor and the torque provided by the engine.

Figure 2:
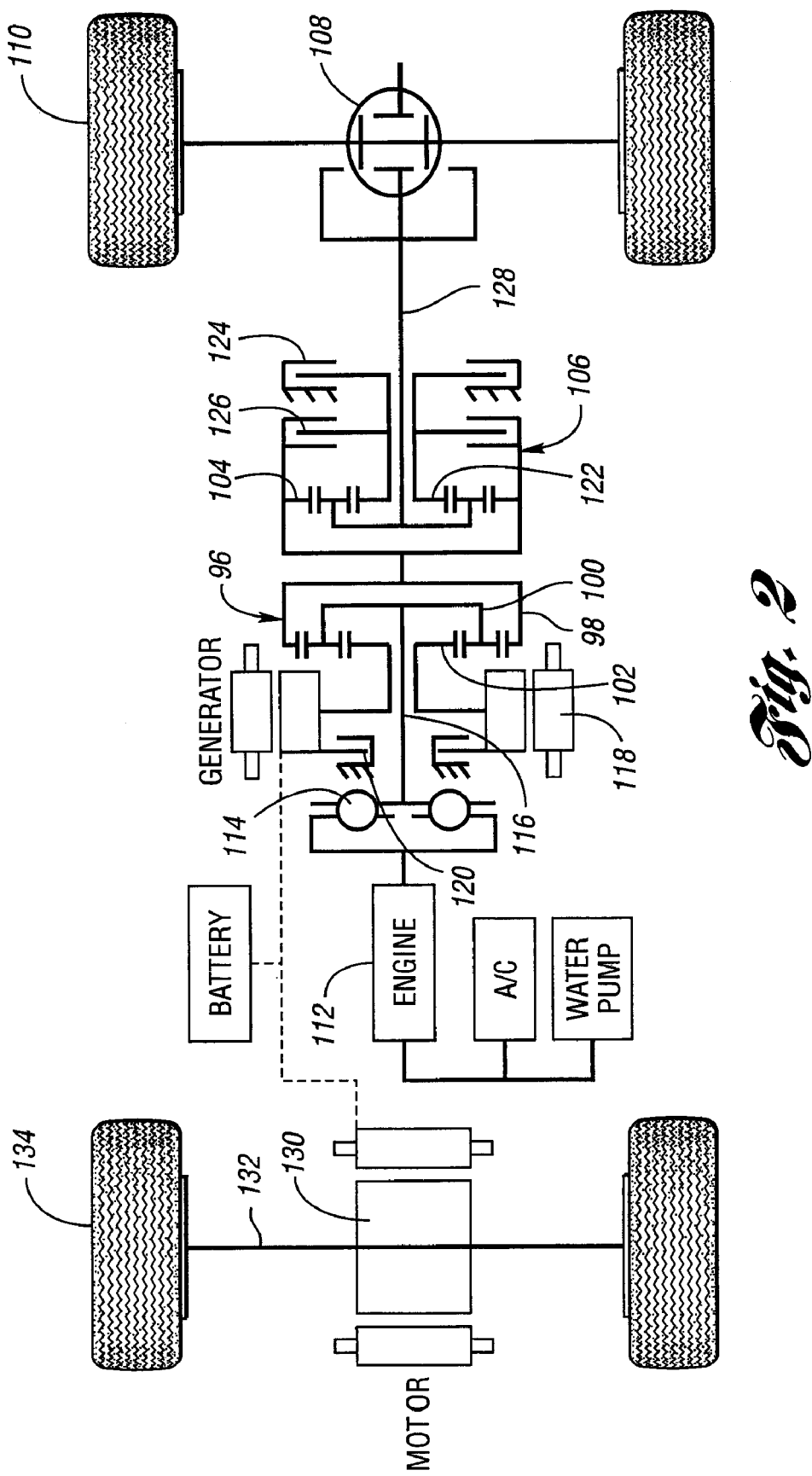
FIG. 2 is a schematic gearing arrangement for an all-wheel drive hybrid-electric powertrain configuration wherein power is transmitted electrically between the sun gear of a first planetary gear unit and an electric motor mounted on a front wheel axis.

In the embodiment of FIG. 2, a first planetary gear unit 96 is included. Its function corresponds to the function of planetary gear unit 60 in the embodiment of FIG. 1. Gear unit 96 includes a ring gear 98, a carrier 100, and a sun gear 102. Ring gear 98 is connected to ring gear 104 of a second planetary gear unit 106 located between the gear unit 96 and a differential-and-axle assembly 108 for rear wheels 110.

Engine 112 drives carrier 100 through a mechanical torque flow path provided by a damper 114 and driveshaft 116. Sun gear 102 and the rotor of a generator 118 are braked by a friction brake 120 against a transmission housing.

The planetary gear unit at the torque output side of the gear unit 96 includes a sun gear 122, which can be anchored selectively by friction brake 124. When the brake 124 is released, a friction clutch 126 can be used to connect selectively sun gear 122 to ring gear 104, thereby establishing a gear ratio of unity in the gear unit 106. When the clutch 126 is released and the sun gear 122 is anchored by the brake 124, torque ratio is increased, thereby multiplying the output shaft torque in shaft 128. Clutch 126 and brake 124 define a clutch and brake friction element sub-assembly.

As in the case of the embodiment of FIG. 1, an electric motor 130 is mounted coaxially on front wheel axle shaft 132 for driving front wheels 134.

Figure 3:
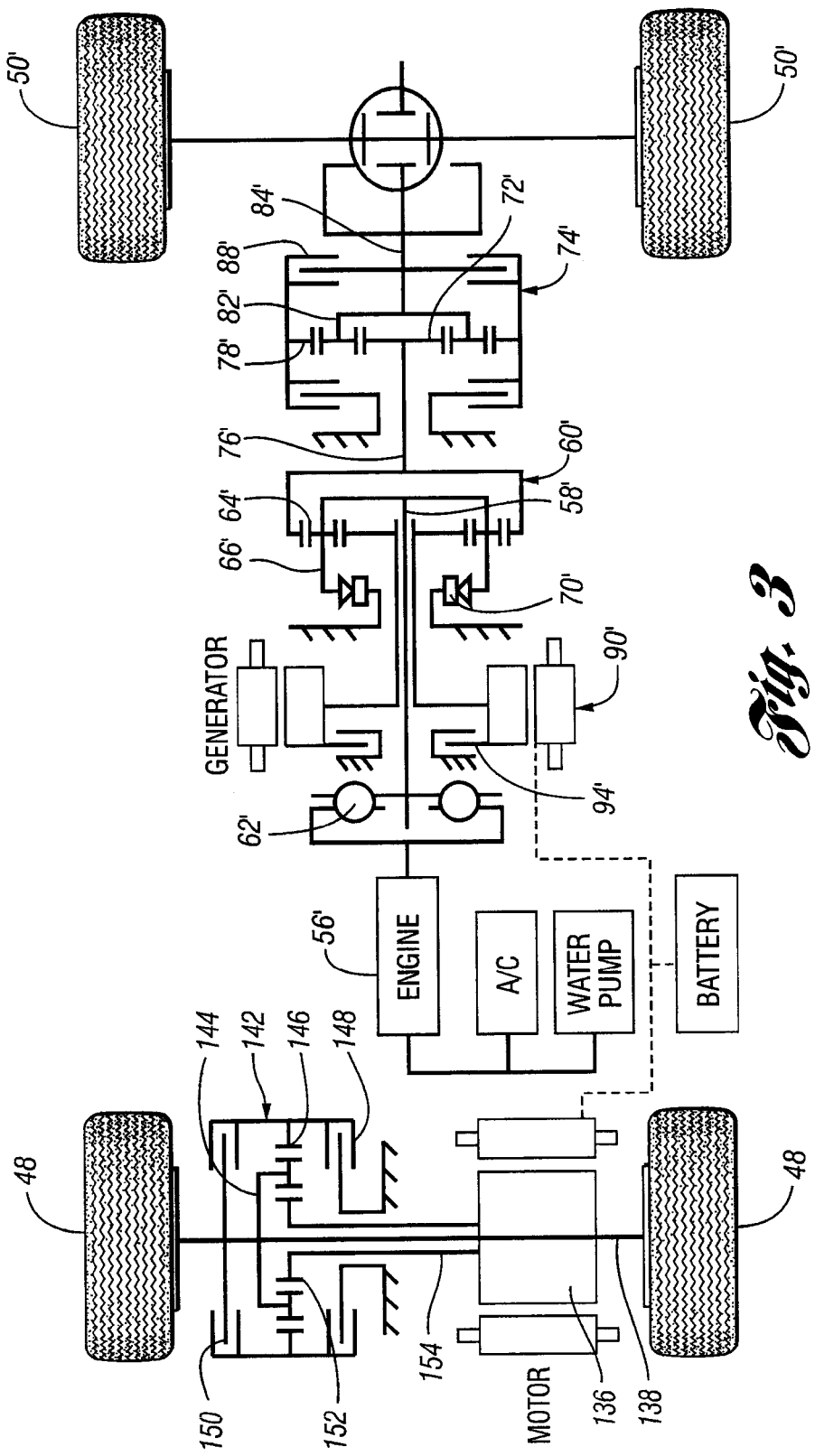
FIG. 3 is a schematic representation of another embodiment of the invention wherein the reaction element of a second gear unit on the engine generator axis may be grounded by a friction brake and a two-speed gear unit connects the motor to the front wheels.

In the embodiment of FIG. 3, the elements of the powertrain between the engine and the differential-and-axle assembly are similar to elements of the powertrain of FIG. 1. For this reason, the numerals used in FIG. 3 correspond to the numerals used in FIG. 1 to illustrate corresponding elements, although prime notations are added to the numerals used in FIG. 3.

In the embodiment of FIG. 3, a motor 136 is mounted on and is drivably connected to axle shaft 138, which drives the front traction wheels 48.

Shaft 138 is connected to the carrier 144 for gear unit 142. Ring gear 146 can be braked by a selectively engageable friction brake 148, or it can be clutched to the carrier by means of a selectively engageable friction clutch 150. This provides a two-speed ratio capability for the front wheel torque flow path.

Sun gear 152 is drivably connected by sleeve shaft 154 to the rotor for the electric motor 136.

As in the case of the design of FIG. 2, the design of FIG. 3 offers a solution to the problem of the inherent inefficiency of regenerative braking using gearing arrangements with a conventional so-called "north-south" configuration, as distinct from a front-wheel drive transaxle configuration. In the case of FIG. 3, the traction motor is installed on the front-wheel drive axis, as in the design of FIG. 2, but it is connected to the front traction wheels through a two-speed planetary gear unit. Thus, there are two two-speed transmissions in the gearing arrangement of FIG. 3. The ratios of the gearing arrangement of FIG. 3 are staggered, which eliminates problems associated with synchronous shifts in the case of a ratio change with a single planetary gear unit where a ratio change requires disengagement of one friction element while synchronously engaging a companion friction element.

Figure 4:
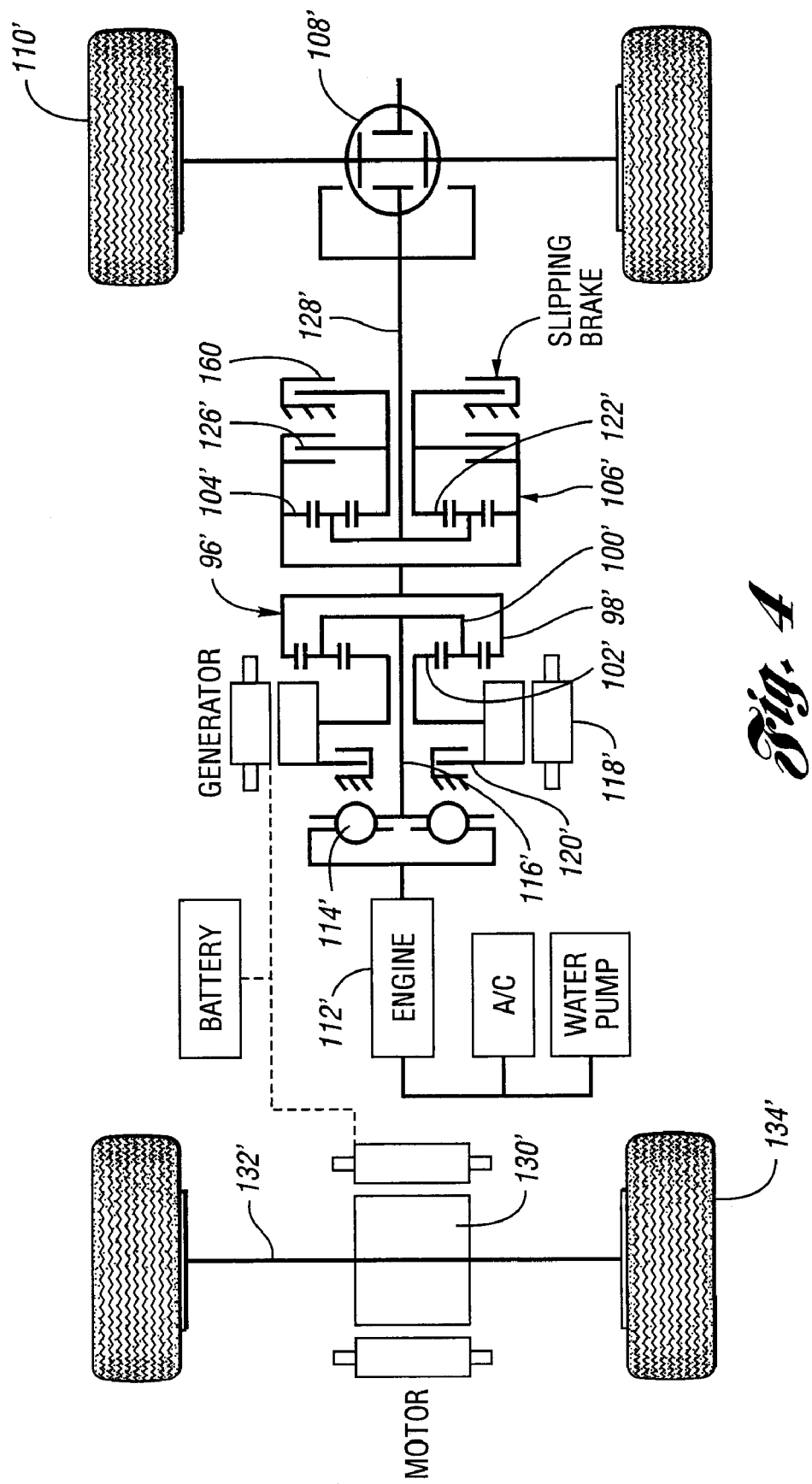
FIG. 4 is a schematic diagram of another embodiment of the invention wherein two planetary gear units are situated on an engine axis in a manner similar to the arrangement of FIG. 2, wherein a second pressure-operated friction brake, which may be a slipping brake, is used to reduce force on the rear wheels.

In the powertrain configuration of FIG. 4, the gearing arrangement is similar to the gearing arrangement of FIG. 2 except that in the case of FIG. 4 a slipping brake 160 is used to provide a torque reaction for sun gear 122'. In the embodiment of FIG. 4, the elements of the powertrain that have a corresponding element in the powertrain of FIG. 2 have been identified by the same reference numerals used in FIG. 2, although prime notations are added to the numerals in FIG. 4.

In the case of the powertrain illustrated in FIG. 4, during engine stop and start events, the brake 160 is slipped at a fixed torque equivalent to the reaction torque required to achieve engine starting. Brake 160 will permit the ring gear 98' to act as a reaction member for the first planetary gear unit 96'. As the generator rotor drives sun gear 102', the generator acts as a starter motor to develop engine cranking torque. Clutch 126' and brake 160 define a clutch and brake friction element sub-assembly.

Figure 4A:
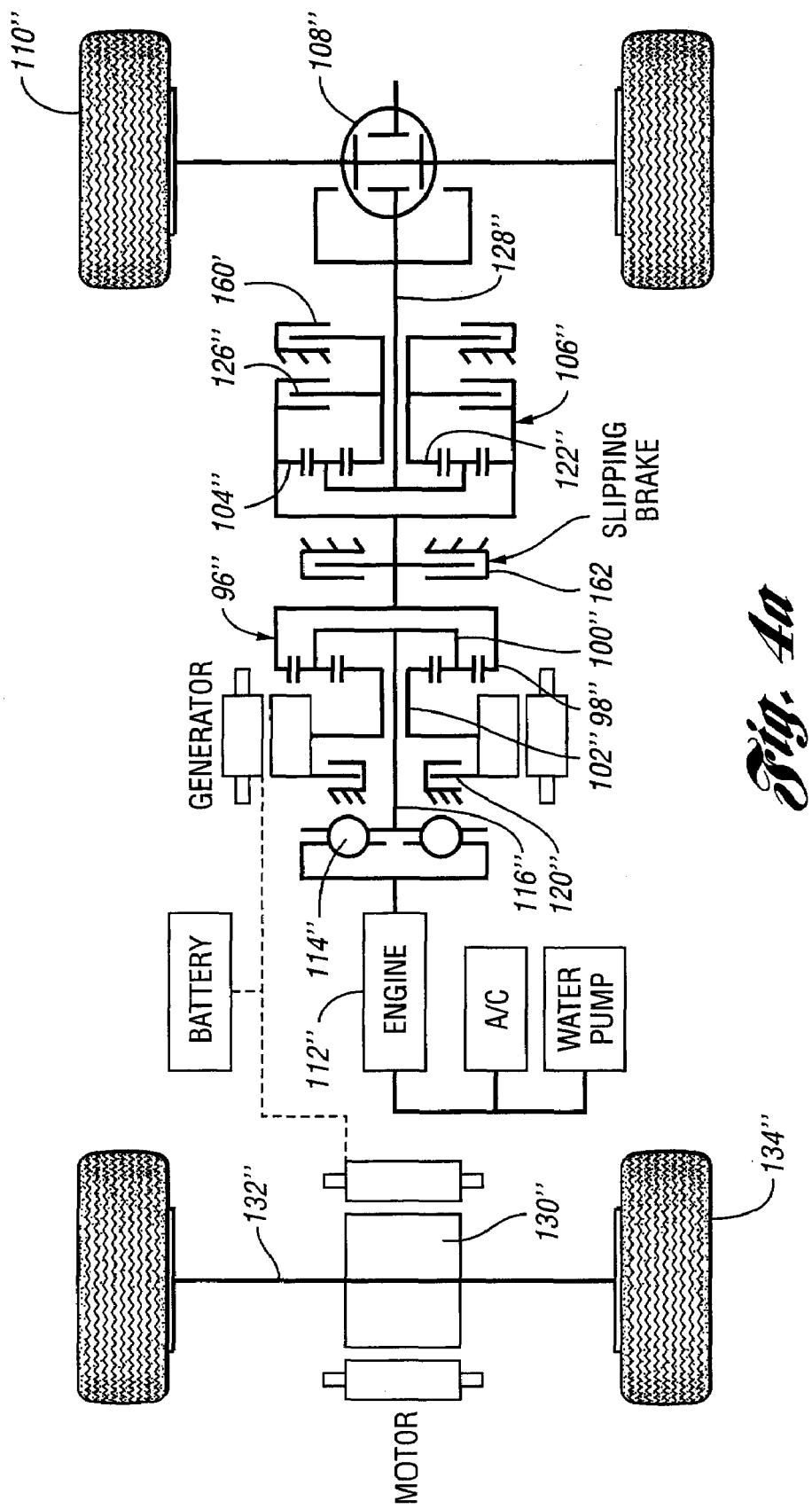
FIG. 4*a* is a schematic representation of a powertrain similar to the powertrain of FIG. 4, but an additional friction brake is provided to ground the ring gear of the first planetary gear unit while the drive clutch and brake for the gear units are disengaged.

In the embodiment illustrated in FIG. 4a, the elements of the configuration are the same as the elements of the embodiment of FIG. 4 except for the addition of a "ring gear-to-ground" brake 162, which provides a direct torque reaction for the ring gear 98" during engine starting as the generator rotor drives the sun gear to achieve engine cranking torque. At this time, the clutch and the brake for the downstream planetary gear unit 106" can be released.

The elements of the configuration of FIG. 4a that have counterpart elements in the configuration of FIG. 4 are assigned the same reference numerals, although double prime notations are used. In the case of the embodiment of FIG. 4a, the brake 160' is used as a low-speed reaction brake, while the clutch 126' acts as a direct-drive clutch. Brake 160' and the clutch 126" provide two speed ratios through the downstream gearing 106". With the brake 160' and the clutch 126" disengaged, torque transfer to the wheels is completely eliminated during engine start and engine shutdown. Once the engine is started and is brought up to a stable operating speed, the friction elements can be engaged to transfer power to the wheels.

Figure 4B:
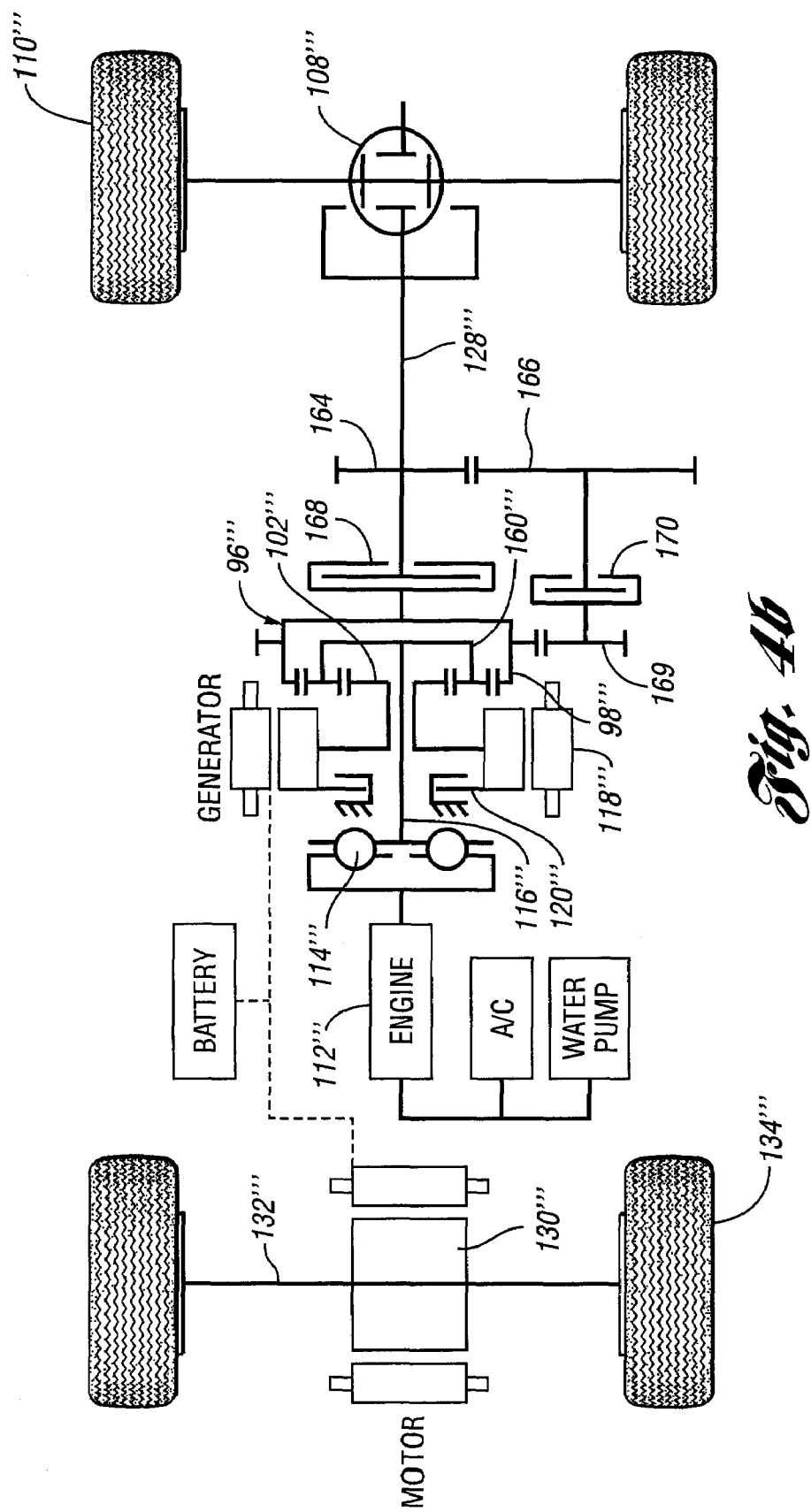
FIG. 4*b* is a schematic representation of a multiple-ratio, hybrid-electric powertrain similar to the powertrain of FIG. 4*a*, although the multiple ratio transmission between the torque output element of the planetary gearing comprises a countershaft gear arrangement rather than a planetary gear arrangement.

In the design of FIG. 4b, the gearing configuration is similar to the configuration of FIG. 2. The downstream planetary gear unit 106 of FIG. 2, however, is replaced in the design of FIG. 4b by countershaft gearing having two ratios. The countershaft gearing comprises a first gear 164 connected to shaft 128" and a countershaft gear 166, which meshes with gear 164. A first clutch 168 is selectively engageable to establish and disestablish a driving connection between gear 164 and ring gear 98" of the planetary gear unit 96".

In the embodiment of FIG. 4b, triple prime notations are used with the numerals to designate elements that have a counterpart in the embodiment of FIG. 2.

Countershaft gear 166 can be connected selectively to a small pitch diameter countershaft gear 169 by a selectively engageable clutch 170. The countershaft gearing of FIG. 4b thus provides a high ratio and a low ratio corresponding to the high ratio and low ratio established by the planetary gearing of FIG. 2 at 106. The mode of operation and the performance of the gearing configuration of FIG. 4b is the same as the mode of operation and the performance of the gearing arrangement of FIG. 2. One design may be preferred over the other, however, depending upon packaging requirements of the powertrain assembly in a hybrid-electric vehicle.

FIGS. 5 and 6 illustrate in schematic form the control strategy for an all-wheel drive hybrid-electric powertrain. As previously described, power can be distributed between the front and rear wheels to achieve the best fuel economy. The power distribution between the front and rear wheels, as explained previously, includes a torque transfer that occurs electrically between the motor and the first planetary gear unit 60 in FIG. 1, for example.

When the hybrid-electric vehicle powertrain is in an all-wheel drive mode, the expectation of the driver is to have a specific distribution of power to the front wheels and to the rear wheels. This can be achieved using the strategy of FIGS. 5 and 6 to force the vehicle to enter a so-called positive power distribution mode, whereby mechanical energy is distributed to the rear wheels and electrical energy is distributed to the front wheels. The engine speed and torque are continuously modified to achieve the correct balance between the two power flow paths.

FIG. 6 is a strategy that is implemented if one of the traction wheels at the rear of the vehicle or at the front exhibits slip. The slip is detected by a powertrain controller and a slip control, illustrated schematically in FIG. 6.

When the vehicle is operating in a pure electric drive mode, only the front wheels are driven, the source of the driving torque being the motor. When the vehicle is operating in positive power distribution mode, the engine develops power and that power is converted by the generator to electrical energy. The reaction torque on the ring gear for the first planetary gear unit (i.e., gear unit 60 of FIG. 1) is delivered to the rear wheels through the downstream planetary gear unit 74. Electrical energy is converted back to mechanical energy by the traction motor, which is electrically coupled to the generator. That mechanical energy is distributed to the front wheels to provide additional traction. The percentage of torque distribution to the front wheels and to the rear wheels can be varied between 0% and 100% for each wheel set.

If the controller conditions the powertrain for operation in a parallel mode, a generator brake, shown at 94 in the case of FIG. 1, is applied. All the energy developed by the engine then is transferred to the rear wheels mechanically. There is no electric power distribution.

If the controller conditions the powertrain to operate with negative power distribution, the motor generates energy as the front wheels are driven, and that energy is transferred to the generator. The generator rotor is driven in a reverse direction and the engine speed then is reduced. In this instance, more than 100% of the total energy is transferred to the rear wheels, and the front wheels actually recover energy. If the operator selects all-wheel drive operation, a power distribution ratio of approximately 50% to 50% requires the vehicle to be in a positive power distribution mode. The controller will alter engine speed and torque to achieve the optimum power distribution. The operating mode is selected based upon the best fuel economy point in an engine speed-torque characteristic plot.

In normal drive at low power demand, there may be a negative distribution of power, whereas when the power demand is high, a positive power distribution mode is used. As the motor at the front wheels generates energy, it acts as a generator. The motor is electrically coupled to the generator, which causes torque to be distributed to the traction wheels. During high power demand, the generator develops power for the motor, so both the front wheels and the rear wheels provide driving torque.

If the operator causes the powertrain to assume an all-wheel drive mode, the engine speed must be increased to prevent the generator rotor from moving in a negative direction. With the increased engine speed, however, the optimum operating point that the controller will use to achieve maximum fuel economy with two-wheel drive will no longer be the operating point during four-wheel drive, so there will be less engine torque available for transferring to the rear wheels. On the other hand, at this time, the generator is driven faster, so electrical power is delivered to the front wheels.

FIG. 5 is a flow chart for a control algorithm. At control block 166, the controller will determine whether four-wheel drive operation has been requested. If the four-wheel drive mode is not on, the engine speed is determined by a first table in the electronic memory of the controller as indicated at action block 168. The engine speed is controlled by the generator, as previously explained. The generator speed can be decreased to make the engine operate at its best operating point.

The generator has better torque control than an engine since, typically in an engine control system, torque of the engine is determined by air flow, or fuel rate or engine spark timing adjustments, which do not produce a torque response as fast as a torque response resulting from generator speed change.

At action block 168, the correct engine speed for each of the possible operating modes is obtained from a table that is compatible with the electric drive mode, the parallel drive mode, the positive power distribution mode, or the negative power distribution mode.

The input for the determination at action block 168 includes a driver demand input 170, which takes into account power losses due to the power demands of accessories such as an air conditioning compressor, a water pump, etc. Vehicle speed, which is an actual vehicle speed measurement, is another input, as shown at 172.

The torque of the engine is determined, as shown at action block 174, using the power demand and the engine speed information. The engine torque then is delivered to the transaxle, as previously explained and as schematically illustrated at 176 in FIG. 5.

If the four-wheel drive mode is selected, as shown at action block 178, a different engine torque and speed table is used, as shown at action block 180 in FIG. 5. The table used in action block 180 is different than the table used in action block 168 because, as previously explained, the generator, which develops electrical energy used by the motor for the front wheels, causes the engine to operate more slowly. The system is calibrated so that high engine efficiency will be maintained even though it is not the optimum efficiency available for two-wheel drive, as represented by the table of action block 168.

As in the case of action block 174, the torque is determined at 182 for all-wheel drive operation using the engine speed and driver demand information for all-wheel drive.

FIG. 6 shows a control strategy for compensating for wheel slip of the front wheels or wheel slip of the rear wheels. Each wheel, as is well known in the design of automatic brake control systems, contains a wheel speed sensor. Wheel speed information from a wheel speed sensor can be used to detect slip at the front wheels as well as at the rear wheels.

The controller will receive driver power demand information at 184 and vehicle speed information at 186 for the determination of engine speed, torque of the engine and torque of the motor, as shown at action block 188. For any of the modes that may be selected, including the electric mode, the parallel mode, and the positive and negative power distribution modes, the information developed at action block 188 is combined at action block 190 with front wheel slip information from action block 192. At action block 190, a change in engine speed, or a delta engine speed, is subtracted from the actual engine speed. The delta engine speed is achieved by decreasing generator speed, as previously explained. A change in engine speed will result in a change in engine torque received from action block 188. The torque information for a given change in engine speed is obtained from the table contained at action block 188. The motor torque at the front wheels is decreased by a delta motor torque. Because of the reduction in generator speed with the torque at the front wheels decreasing and the torque at the rear wheels increasing, the total wheel torque remains the same.

If rear wheel slip is detected at action block 194, the engine speed will be increased by a delta engine speed value, as shown at action block 196. The torque on the engine that accompanies the increase in engine speed will decrease by a delta torque value, as indicated at action block 196. Further, the torque on the motor will be equal to the wheel torque plus a delta motor torque, as the generator speed is altered by the controller. As in the case of action block 190, the total wheel torque remains the same, as shown at action block 196.

Each action block 190 and 196 produces the system controller output parameters, which are indicated at action block 198. Those parameters are used in the calculation of a delta engine torque, the delta engine speed and the delta motor torque.

When engine speed is increased at action block 196, the operating point on the engine speed and torque characteristic plot deviates from the optimum point, so less torque is transferred to the rear wheels, but the generator is driven faster. Because of this, more power goes to the front wheels. In the case of action block 190, the converse of this sequence is true.

Although embodiments of the invention have been disclosed, it will be apparent to those persons skilled in the art that modifications may be made without departing from the scope of the invention. All such modifications and equivalents thereof are intended to be covered by the following claims.

What is claimed:

1. A powertrain for an all-wheel drive vehicle with forward and rearward sets of traction wheels, the powertrain comprising:
    an engine;
    an electric generator;
    an electric motor;
    a geared transmission having a first torque delivery element connected drivably to the engine, a second torque delivery element connected drivably to the generator, and a torque output element;
    the electric motor being drivably connected to the forward set of traction wheels and being electrically coupled to the generator; and
    a multiple ratio gear unit drivably connecting the torque output element of the geared transmission to the rearward set of traction wheels, whereby mechanical energy is distributed to the rearward set of traction wheels and electrical energy is distributed to the forward set of traction wheels;
    the multiple ratio gear unit comprising discrete ratio gearing with distinct ratio steps in a torque flow path from the torque output element of the geared transmission to the rearward traction wheels.

2. The powertrain set forth in claim 1 wherein the geared transmission comprises:
    a planetary gear unit having a ring gear, a planetary carrier and a sun gear;
    the engine being drivably connected to the carrier;
    the generator being drivably connected to the sun gear; and
    the torque output element of the geared transmission being drivably connected to the ring gear.

3. The powertrain set forth in claim 2 wherein the geared transmission further comprises:
    a generator brake, the generator brake being applied to effect operation of the powertrain in a parallel mode, whereby all of the energy for powering the vehicle is transferred to the rearward set of wheels mechanically.

4. The powertrain set forth in claim 1 wherein the engine develops mechanical energy and the geared transmission transfers the mechanical energy to the generator, whereby the generator converts the mechanical energy to electrical energy for the electric motor in a positive power distribution operating mode.

5. The powertrain set forth in claim 1 wherein the electric motor functions to generate electrical energy as it is driven by the forward set of traction wheels, whereby the generator develops power opposing engine power to reduce engine speed in a negative power distribution mode.

* * * * *